(12) United States Patent  
Duan et al.

(10) Patent No.: US 11,909,182 B1
(45) Date of Patent: Feb. 20, 2024

(54) OVERHEAD LINE DETECTION METHOD AND SYSTEM BASED ON CABLE INSPECTION ROBOT

(71) Applicants: State Grid Jiangsu Electric Power Co., Ltd., Changzhou Branch, Jiangsu (CN); State Grid Jiangsu Electric Power Co., Ltd., Innovation Center, Jiangsu (CN); State Grid Jiangsu Electric Power Co., Ltd., Jiangsu (CN); State Grid Corporation of China, Beijing (CN)

(72) Inventors: Jiazhen Duan, Jiangsu (CN); Zheng Lu, Jiangsu (CN); Hongtao Liu, Jiangsu (CN); Ruxin Shi, Jiangsu (CN); Wei Zhang, Jiangsu (CN); Yuqin Shu, Changzhou (CN); Zhiwei Kan, Jiangsu (CN); Yannan Chen, Jiangsu (CN); Xiaoqiang Chen, Jiangsu (CN); Xianming Ren, Jiangsu (CN)

(73) Assignees: State Grid Jiangsu Electric Power Co., Ltd., Changzhou Branch, Jiangsu (CN); State Grid Jiangsu Electric Power Co., Ltd., Innovation Center, Jiangsu (CN); State Grid Jiangsu Electric Power Co., Ltd., Jiangsu (CN); State Grid Corporation of China, Beijing (CN)

( * ) Notice: Subject to any disclaimer, the term of this patent is extended or adjusted under 35 U.S.C. 154(b) by 0 days.

(21) Appl. No.: 18/548,069

(22) PCT Filed: Nov. 28, 2022

(86) PCT No.: PCT/CN2022/134818
§ 371 (c)(1),
(2) Date: Aug. 25, 2023

(30) Foreign Application Priority Data

Jun. 20, 2022 (CN) .......................... 202210695441.2

(51) Int. Cl.
*H02G 1/02* (2006.01)
*G01N 21/88* (2006.01)

(52) U.S. Cl.
CPC ............ *H02G 1/02* (2013.01); *G01N 21/8851* (2013.01)

(58) Field of Classification Search
CPC .............................. H02G 1/02; G01N 21/8851
See application file for complete search history.

(56) References Cited

U.S. PATENT DOCUMENTS

2018/0080755 A1  3/2018  Held et al.
2021/0319573 A1  10/2021  Zhang et al.

FOREIGN PATENT DOCUMENTS

CN    103322948 A    9/2013
CN    106546263 A    3/2017
(Continued)

OTHER PUBLICATIONS

International Search Report dated Mar. 16, 2023 from corresponding PCT Application No. PCT/CN2022/134818.
(Continued)

*Primary Examiner* — Jamil Ahmed
(74) *Attorney, Agent, or Firm* — ArentFox Schiff LLP

(57) ABSTRACT

Provided are an overhead line detection method and system based on a cable inspection robot. The cable inspection robot is suspended on the overhead line. An imaging unit and a laser emission unit are disposed at the front end of the cable inspection robot. The imaging unit is at a first angle to the overhead line. The laser emission unit is at a second angle to the overhead line. The overhead line detection method includes the following steps: controlling the laser emission unit to emit N groups of parallel laser beams to the overhead line to form N parallel laser lines on the overhead line; controlling the imaging unit to shoot the overhead line and (Continued)

the N parallel laser lines to acquire a target detection image; performing image recognition on the target detection image to acquire N laser line diameters corresponding to the N parallel laser lines on the overhead line; and comparing the N laser line diameters with theoretical line diameters at corresponding positions to determine whether the overhead line is abnormal. Therefore, the accuracy and efficiency of the inspection can be greatly improved, and the inspection risk can be reduced.

9 Claims, 3 Drawing Sheets

(56)  References Cited

FOREIGN PATENT DOCUMENTS

| | | | |
|---|---|---|---|
| CN | 107907048 A | 4/2018 | |
| CN | 108564621 A | 9/2018 | |
| CN | 108919838 A | 11/2018 | |
| CN | 109737951 A | 5/2019 | |
| CN | 113191394 A | 7/2021 | |
| CN | 113628170 A | 11/2021 | |
| CN | 113960069 A | 1/2022 | |
| CN | 114111651 A | 3/2022 | |
| CN | 114227717 A | 3/2022 | |
| CN | 114241257 A | 3/2022 | |
| CN | 114252075 A | 3/2022 | |
| CN | 114778560 A | 7/2022 | |
| JP | H10117415 A | * 5/1998 | ............... H02G 1/02 |
| JP | 2019015508 A | 1/2019 | |

OTHER PUBLICATIONS

Office action dated Jul. 29, 2022 from corresponding Chinese Application No. 202210695441.2 (submitted as OEE work product with PPH Request).

* cited by examiner

OVERHEAD LINE DETECTION METHOD AND SYSTEM BASED ON CABLE INSPECTION ROBOT

CROSS REFERENCE TO RELATED APPLICATION(S)

This application is a National Phase entry of PCT Application No. PCT/CN2022/134818, entitled "OVERHEAD LINE DETECTION METHOD AND SYSTEM BASED ON CABLE INSPECTION ROBOT" and filed on Nov. 28, 2022, which claims priority of Chinese Application No. 202210695441.2, entitled "OVERHEAD LINE DETECTION METHOD AND SYSTEM BASED ON CABLE INSPECTION ROBOT" and filed on Jun. 20, 2022, both of which are expressly incorporated by reference herein in their entirety.

TECHNICAL FIELD

The present invention relates to the technical field of overhead line detection and, in particular, to an overhead line detection method based on a cable inspection robot and an overhead line detection system based on a cable inspection robot.

BACKGROUND

An overhead transmission line is the infrastructure of the National Grid and the main carrier of long-distance transmission and has profound significance to the national daily life security and economic development. A transmission cable is made of multiple strands of bare steel-core aluminum stranded wires. When the surface of the aluminum metal is exposed to a field environment and under the influence of environmental factors such as rain, snow, and ice and the continuous mechanical tension, abnormal states such as scattered strands, broken strands, corrosion, and damage easily occur, thereby causing a power transmission fault or even a serious safety accident. Therefore, the inspection and maintenance of overhead transmission lines is an important work of the power department.

In the related art, the inspection of an overhead transmission line mainly adopts two modes: a manual inspection mode and an unmanned aerial vehicle auxiliary inspection mode. Manual inspection has low accuracy and efficiency, and high risk. Unmanned aerial vehicle auxiliary inspection is greatly affected by environmental factors (such as light brightness change and cable reflection), and the accuracy is low.

SUMMARY

To solve the technical problems of low accuracy and efficiency and high risk of the inspection of overhead transmission lines in the related art, the present invention provides an overhead line detection method and system based on a cable inspection robot. Laser lines are formed on an overhead line to determine whether the overhead line is abnormal. Manual inspection is not required. Therefore, the accuracy and efficiency of inspection can be greatly improved, and the inspection risk is reduced.

The present invention adopts the technical solutions described below.

An overhead line detection method based on a cable inspection robot is provided. The cable inspection robot is suspended on the overhead line. An imaging unit and a laser emission unit are disposed at the front end of the cable inspection robot. The optical axis of the imaging unit is at a first angle to the overhead line. The optical axis of the laser emission unit is at a second angle to the overhead line. The overhead line detection method includes the following steps: controlling the laser emission unit to emit N groups of parallel laser beams to the overhead line to form N parallel laser lines on the overhead line, where N is a positive integer; controlling the imaging unit to shoot the overhead line and the N parallel laser lines to acquire a target detection image; performing image recognition on the target detection image to acquire N laser line diameters corresponding to the N parallel laser lines on the overhead line; and comparing the N laser line diameters with theoretical line diameters at corresponding positions to determine whether the overhead line is abnormal.

According to an embodiment of the present invention, performing image recognition on the target detection image to acquire N laser line diameters corresponding to the N parallel laser lines on the overhead line specifically includes: extracting a light strip with a width of a single pixel from a j-th parallel laser line by using a thinning algorithm to acquire a j-th light strip centerline, where $1 \leq j \leq N$, and j is a positive integer; acquiring a pixel set of the j-th light strip centerline in the target detection image; and performing least-square circle fitting on the pixel set to acquire a j-th laser line diameter corresponding to the j-th parallel laser line.

According to an embodiment of the present invention, comparing the N laser line diameters with the theoretical line diameters at corresponding positions to determine whether the overhead line is abnormal specifically includes: calculating distances between all pixels of the j-th light strip centerline and the imaging unit by using a laser triangulation method, and selecting a first distance between the lowest pixel in the all pixels of the j-th light strip centerline and the imaging unit; acquiring a fitting model, and acquiring a theoretical line diameter corresponding to the j-th laser line diameter according to the first distance by using the fitting model; comparing the j-th laser line diameter with the theoretical line diameter corresponding to the j-th laser line diameter; and in response to the j-th laser line diameter not matching the theoretical line diameter corresponding to the j-th laser line diameter, determining that the overhead line is abnormal.

According to an embodiment of the present invention, comparing the j-th laser line diameter with the theoretical line diameter corresponding to the j-th laser line diameter to determine whether the j-th laser line diameter matches the theoretical line diameter corresponding to the j-th laser line diameter specifically includes: calculating a similarity between the j-th laser line diameter and the theoretical line diameter corresponding to the j-th laser line diameter; in response to the similarity being greater than or equal to a preset similarity, determining that the j-th laser line diameter matches the theoretical line diameter corresponding to the j-th laser line diameter; and in response to the similarity being less than the preset similarity, determining that the j-th laser line diameter does not match the theoretical line diameter corresponding to the j-th laser line diameter.

According to an embodiment of the present invention, acquiring the fitting model includes: controlling the laser emission unit to emit K groups of parallel laser beams to an overhead line without abnormality to form K parallel laser lines on the overhead line, where K is a positive integer; controlling the imaging unit to shoot the overhead line and the K parallel laser lines to acquire a sample image; extracting a light strip with a width of a single pixel from each of the K parallel laser lines by using the thinning algorithm to acquire K light strip centerlines corresponding to the K parallel laser lines; acquiring a pixel set of each of the light strip centerlines in the sample image, and performing least-square circle fitting on the pixel set of the each of the light strip centerlines in the sample image to acquire K to-be-trained laser line diameters corresponding to the K parallel laser lines; calculating distances between all pixels of the each of the light strip centerlines and the imaging unit by using the laser triangulation method, and selecting a second distance between the lowest pixel of the each of the light strip centerlines and the imaging unit; and obtaining the fitting model by training a fitting algorithm according to a to-be-trained laser line diameter of the K to-be-trained laser line diameters corresponding to the each of the K parallel laser lines and the second distance.

An overhead line detection system based on a cable inspection robot is provided. The cable inspection robot is suspended on the overhead line. An imaging unit and a laser emission unit are disposed at the front end of the cable inspection robot. The optical axis of the imaging unit is at a first angle to the overhead line. The optical axis of the laser emission unit is at a second angle to the overhead line. The overhead line detection system includes a first control module, a second control module, an image recognition module, and an abnormality detection module. The first control module is configured to control the laser emission unit to emit N groups of parallel laser beams to the overhead line to form N parallel laser lines on the overhead line, where N is a positive integer. The second control module is configured to control the imaging unit to shoot the overhead line and the N parallel laser lines to acquire a target detection image. The image recognition module is configured to perform image recognition on the target detection image to acquire N laser line diameters corresponding to the N parallel laser lines on the overhead line. The abnormality detection module is configured to compare the N laser line diameters with theoretical line diameters at corresponding positions to determine whether the overhead line is abnormal.

According to an embodiment of the present invention, the image recognition module is further configured to extract a light strip with a width of a single pixel from a j-th parallel laser line by using a thinning algorithm to acquire a j-th light strip centerline, where 1≤j≤N, and j is a positive integer; acquire a pixel set of the j-th light strip centerline in the target detection image; and perform least-square circle fitting on the pixel set to acquire a j-th laser line diameter corresponding to the j-th parallel laser line.

According to an embodiment of the present invention, the abnormality detection module is further configured to calculate distances between all pixels of the j-th light strip centerline and the imaging unit by using a laser triangulation method, and select a first distance between the lowest pixel of the j-th light strip centerline and the imaging unit; acquire a theoretical line diameter corresponding to the j-th laser line diameter according to the first distance by using a fitting model; compare the j-th laser line diameter with the theoretical line diameter corresponding to the j-th laser line diameter; and in response to the j-th laser line diameter not matching the theoretical line diameter corresponding to the j-th laser line diameter, determine that the overhead line is abnormal.

According to an embodiment of the present invention, the abnormality detection module is further configured to calculate a similarity between the j-th laser line diameter and the theoretical line diameter corresponding to the j-th laser line diameter; in response to the similarity being greater than or equal to a preset similarity, determine that the j-th laser line diameter matches the theoretical line diameter corresponding to the j-th laser line diameter; and in response to the similarity being less than the preset similarity, determine that the j-th laser line diameter does not match the theoretical line diameter corresponding to the j-th laser line diameter.

According to an embodiment of the present invention, the abnormality detection module is further configured to control the laser emission unit to emit K groups of parallel laser beams to an overhead line without abnormality to form K parallel laser lines on the overhead line, where K is a positive integer; control the imaging unit to shoot the overhead line and the K parallel laser lines to acquire a sample image; extract a light strip with a width of a single pixel from each of the K parallel laser lines by using the thinning algorithm to acquire K light strip centerlines corresponding to the K parallel laser lines; acquire a pixel set of each of the light strip centerlines in the sample image, and perform least-square circle fitting on the pixel set of the each of the light strip centerlines in the sample image to acquire K to-be-trained laser line diameters corresponding to the K parallel laser lines; calculate distances between all pixels of the each of the light strip centerlines and the imaging unit by using the laser triangulation method, and select a second distance between the lowest pixel of the each of the light strip centerlines and the imaging unit; and obtain the fitting model by training a fitting algorithm according to a to-be-trained laser line diameter of the K to-be-trained laser line diameters corresponding to the each of the K parallel laser lines and the second distance.

A computer device includes a memory, a processor, and a computer program stored in the memory and executable by the processor. The processor, when executing the computer program, implements the preceding overhead line detection method based on a cable inspection robot.

A non-transitory computer-readable storage medium stores a computer program which, when executed by a processor, implements the preceding overhead line detection method based on a cable inspection robot.

The beneficial effects of the present invention are described below.

According to the present invention, laser lines are formed on an overhead line. Corresponding laser paths are acquired according to the laser lines. The laser paths are compared with theoretical line diameters at corresponding positions to determine whether the overhead line is abnormal. Thus, manual inspection is not required. The accuracy and efficiency of inspection can be greatly improved, and the inspection risk is reduced.

DETAILED DESCRIPTION

The technical solutions in the embodiments of the present invention are described clearly and completely in connection with the drawings in the embodiments of the present invention. Apparently, the embodiments described are part, not all, of the embodiments of the present invention. Based on embodiments of the present invention, all other embodiments obtained by those of ordinary skill in the art without creative work are within the scope of the present invention.

Figure 1:
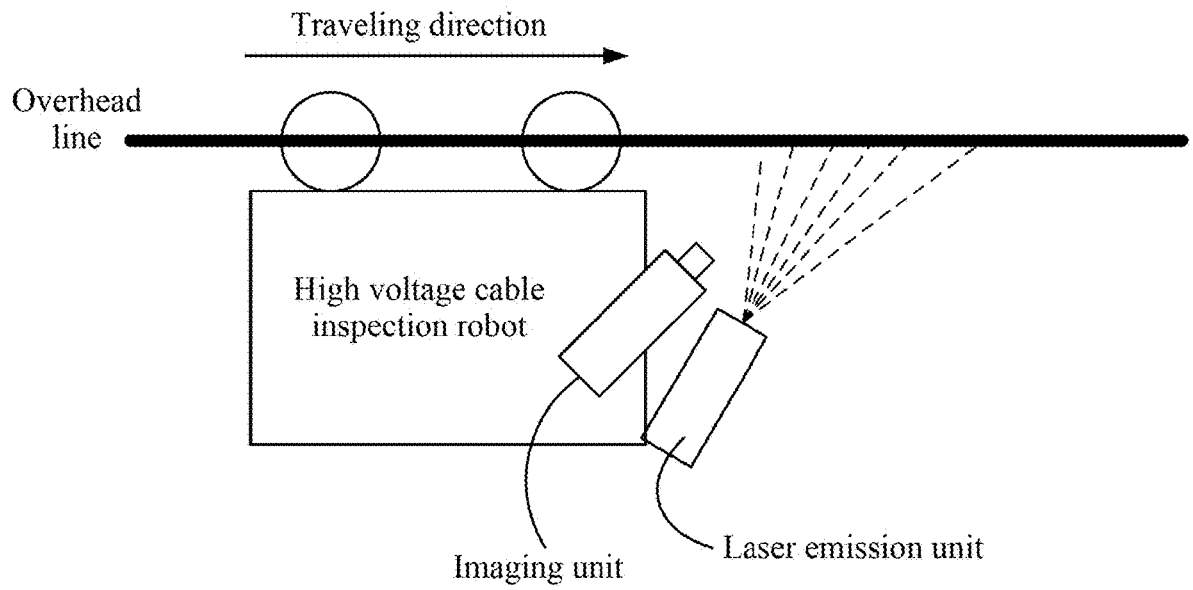
FIG. 1 is a diagram illustrating the structure of a cable inspection robot according to an embodiment of the present invention.

As shown in FIG. 1, a cable inspection robot according to an embodiment of the present invention is suspended on an overhead line. An imaging unit and a laser emission unit are disposed at the front end of the cable inspection robot. The front end of the cable inspection robot is one end in the traveling direction of the cable inspection robot. The imaging unit may be a camera. The laser emission unit may be a laser. The optical axis of the imaging unit is at a first angle to the overhead line. The optical axis of the laser emission unit is at a second angle to the overhead line. The first angle is greater than 0 degrees and less than 90 degrees (for example, 30 degrees). The second angle is greater than 0 degrees and less than 90 degrees (for example, 60 degrees). The relationship between the first angle and the second angle can be calibrated according to actual situations to ensure that the imaging unit can shoot all parallel laser lines formed by the laser emission unit on the overhead line.

Figure 2:
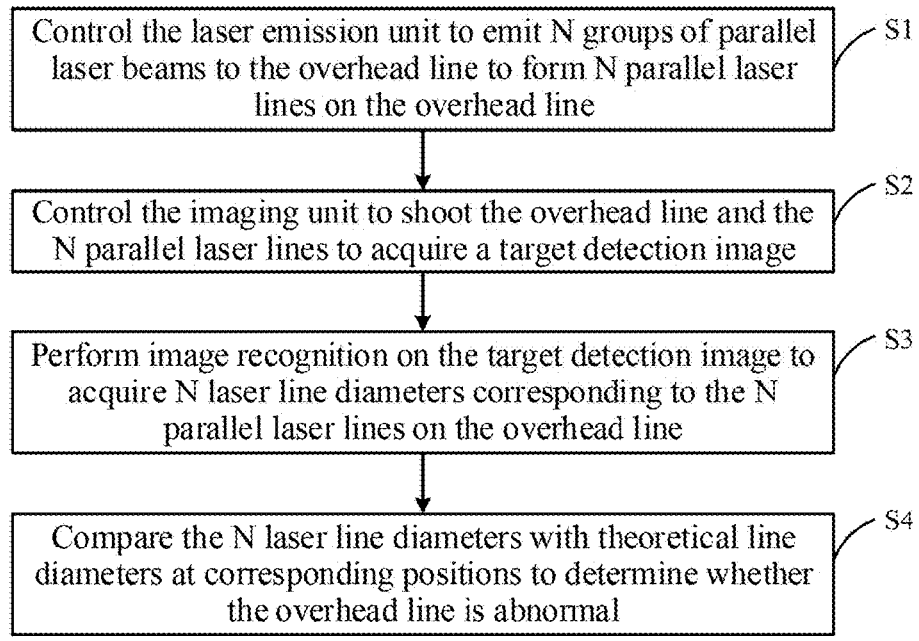
FIG. 2 is a flowchart of an overhead line detection method based on a cable inspection robot according to an embodiment of the present invention.

FIG. 2 is a flowchart of an overhead line detection method based on a cable inspection robot according to an embodiment of the present invention.

As shown in FIG. 2, the overhead line detection method based on a cable inspection robot according to this embodiment of the present invention may include the following steps.

In S1, the laser emission unit is controlled to emit N groups of parallel laser beams to the overhead line to form N parallel laser lines on the overhead line. N is a positive integer.

Specifically, N groups of parallel laser beams are emitted to the overhead line by the laser emission unit. For example, 9 groups of parallel laser beams are irradiated to the overhead line. The second angle between the laser emission unit and the overhead line can be set to ensure that the parallel laser beams are irradiated to a position of a preset distance in front of the cable inspection robot, for example, a position of 30 to 60 cm in front of the cable inspection robot. At this time, N parallel laser lines, for example, 9 parallel laser lines, can be formed on the overhead line. Since the laser emission unit emits laser lines (for example, red laser lines), the laser lines have a strong penetrating capability and can leave linear light strips on the cable in the case of strong outdoor light.

In S2, the imaging unit is controlled to shoot the overhead line and the N parallel laser lines to acquire a target detection image.

Figure 3:
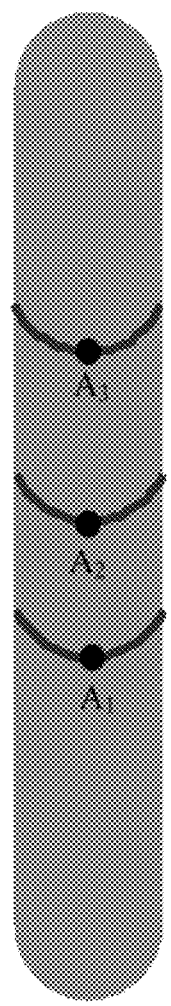
FIG. 3 is a diagram of an object detection image according to an embodiment of the present invention.

Specifically, by setting the first angle between the imaging unit and the overhead line, the imaging unit can shoot the N parallel laser lines on the overhead line to acquire the target detection image. That is, as shown in FIG. 3, the target detection image may include the overhead line and the N parallel laser lines on the overhead line.

In S3, image recognition is performed on the target detection image to acquire N laser line diameters corresponding to the N parallel laser lines on the overhead line.

Specifically, a light strip with a width of a single pixel is extracted from a j-th parallel laser line by using a thinning algorithm to acquire a j-th light strip centerline. Then, a pixel set of the j-th light strip centerline in the target detection image is acquired. Finally, least-square circle fitting is performed on the pixel set to acquire a j-th laser line diameter corresponding to the j-th parallel laser line. $1 \leq j \leq N$, and j is a positive integer.

To accurately measure a laser line diameter, the light strip centerline of each parallel laser line needs to be identified first. According to the present invention, gaps between parallel laser lines do not need to be considered. Therefore, according to the present invention, a light strip with a width of a single pixel can be extracted from each parallel laser line by using a thinning algorithm to acquire a corresponding light strip centerline. Thus, the extraction speed is fast, and this process is not easily affected by noise.

Further, after a light strip centerline of each parallel laser line is extracted, that is, the light strip centerline of the j-th parallel laser line (the j-th light strip centerline) is extracted, the pixel set of the j-th light strip centerline in the target detection image can be acquired and denoted as a pixel set Pj (xk, yk) (k=1, 2, . . . , nj), where nj is the number of pixels of the j-th laser centerline. Then, least-square circle fitting is performed on the collected pixel set Pj (xk, yk) to obtain the j-th laser line diameter corresponding to the j-th parallel laser line.

In S4, the N laser line diameters are compared with theoretical line diameters at corresponding positions to determine whether the overhead line is abnormal.

Figure 4:
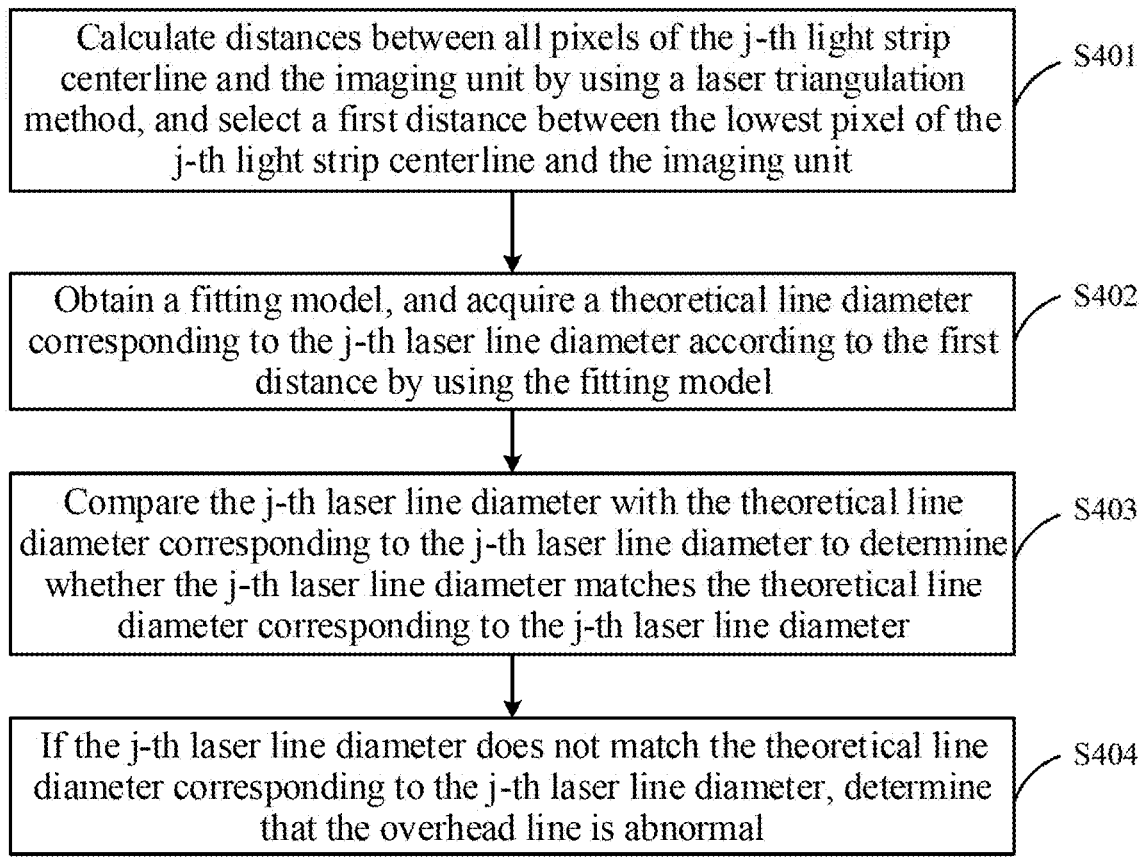
FIG. 4 is a flowchart of a method for determining whether an overhead line is abnormal according to an embodiment of the present invention.

In an embodiment of the present invention, as shown in FIG. 4, comparing the N laser line diameters with the theoretical line diameters at corresponding positions to determine whether the overhead line is abnormal may include the following steps.

S401, distances between all pixels of the j-th light strip centerline and the imaging unit are calculated by using a laser triangulation method, and a first distance between the lowest pixel of the j-th light strip centerline and the imaging unit is selected. The distance between the lowest pixel in the all pixels of the j-th light strip centerline and the imaging unit may be the distance between the lowest pixel in the all pixels of the j-th light strip centerline and the center of the front main surface of the lens of the imaging unit.

Specifically, as shown in FIG. 3, parallel laser lines irradiated by the laser emission unit on the overhead line may be arc-shaped. Therefore, extracted light strip centerlines are also arc-shaped. In the image, the light strip centerlines are in the shape of low in the middle and high on two sides. Correspondingly, the lowest pixel in the all pixels of the j-th light strip centerline can be Aj (only three light strip centerlines are shown in FIG. 3). The lowest pixel in the all pixels of a first light strip centerline may be $A_1$. The lowest pixel in the all pixels of a second light strip centerline may be $A_2$. The lowest pixel in the all pixels of a third light strip centerline may be $A_3$.

After the distances between all pixels of each light strip centerline and the imaging unit are calculated by using the laser triangulation method, the distance between the lowest pixel in the all pixels of each light strip centerline and the imaging unit, that is, the first distance, can be selected. For example, as shown in FIG. 3, the distance between the lowest pixel $A_1$ of the first light strip centerline and the imaging unit is selected. The distance between the lowest pixel $A_2$ of the second light strip centerline and the imaging unit is selected. The distance between the lowest pixel $A_3$ of the third light strip centerline and the imaging unit is selected. That is, in the process of determining whether the overhead line is abnormal, the first distance can be a distance between the lowest pixel of each light strip centerline and the imaging unit selected after the distances between all the pixels of each light strip centerline and the imaging unit are calculated by using the laser triangulation method.

In S402, a fitting model is obtained. A theoretical line diameter corresponding to the j-th laser line diameter is acquired according to the first distance by using the fitting model.

Specifically, after the first distance corresponding to the j-th parallel laser line is selected, the first distance can be input to the fitting model. At this time, the fitting model can output a corresponding theoretical line diameter, that is, a theoretical line diameter corresponding to the j-th laser line diameter.

It is to be noted that the fitting model can be obtained before the theoretical line diameter corresponding to the j-th laser line diameter is acquired according to the first distance by using the fitting model. The following describes in detail how to acquire a fitting model in connection with embodiments.

According to an embodiment of the present invention, before the least-square circle fitting is performed on the j-th laser line diameter corresponding to the j-th parallel laser line and the first distance by using the fitting model, the method also includes controlling the laser emission unit to emit K groups of parallel laser beams to an overhead line without abnormality to form K parallel laser lines on the overhead line, where K is a positive integer; controlling the imaging unit to shoot the overhead line and the K parallel laser lines to acquire a sample image; extracting a light strip with a width of a single pixel from each of the K parallel laser lines by using the thinning algorithm to acquire K light strip centerlines corresponding to the K parallel laser lines; acquiring a pixel set of each of the light strip centerlines in the sample image, and performing least-square circle fitting on the pixel set of the each of the light strip centerlines in the sample image to acquire K to-be-trained laser line diameters corresponding to the K parallel laser lines; calculating distances between all pixels of the each of the light strip centerlines and the imaging unit by using the laser triangulation method, and selecting a second distance between the lowest pixel of the each of the light strip centerlines and the imaging unit; and training a fitting algorithm according to a to-be-trained laser line diameter of the K to-be-trained laser line diameters corresponding to the each of the K parallel laser lines and the second distance to acquire the fitting model.

Specifically, K groups of parallel laser beams can be first emitted to the overhead line without abnormality by the laser emission unit to form K parallel laser lines on the overhead line. The overhead line and the K parallel laser lines are shot by the imaging unit to acquire a sample image. The sample image may include the overhead line without abnormality and the K parallel laser lines on the overhead line without abnormality. Then, a light strip with a width of a single pixel is extracted from each of the K parallel laser lines by using the thinning algorithm to acquire K light strip centerlines corresponding to the K parallel laser lines. A pixel set of each of the light strip centerlines in the sample image is acquired. Least-square circle fitting is performed on the pixel set of the each of the light strip centerlines in the sample image to acquire K to-be-trained laser line diameters corresponding to the K parallel laser lines. Specific methods can refer to the preceding embodiments. To avoid redundancy, details are not described herein.

Further, distances between all pixels of each of the light strip centerlines and the imaging unit is calculated by using the laser triangulation method. A distance between the lowest pixel of the each of the light strip centerlines and the imaging unit, that is, the second distance, is selected. That is, in the process of acquiring the fitting model, the second distance can be a distance between the lowest pixel of each of the light strip centerlines and the imaging unit selected after the distances between all the pixels of each of the light strip centerlines and the imaging unit are calculated by using the laser triangulation method. Thus, the K to-be-trained laser line diameters corresponding to the K parallel laser lines and the second distance are used as inputs. The K to-be-trained laser line diameters are used as outputs to train the fitting algorithm to acquire the fitting model.

In S403, the j-th laser line diameter is compared with the theoretical line diameter corresponding to the j-th laser line diameter to determine whether the j-th laser line diameter matches the theoretical line diameter corresponding to the j-th laser line diameter.

In a possible embodiment, a similarity between the j-th laser line diameter and the theoretical line diameter corresponding to the j-th laser line diameter can be calculated to determine whether the j-th laser line diameter matches the theoretical line diameter corresponding to the j-th laser line diameter according to the similarity. Specifically, the similarity between the j-th laser line diameter and the theoretical line diameter corresponding to the j-th laser line diameter can be calculated by using the Frecher distance in MATLAB. If the similarity is greater than or equal to a preset similarity, it is determined that the j-th laser line diameter matches the theoretical line diameter corresponding to the j-th laser line diameter. If the similarity is less than the preset similarity, it is determined that the j-th laser line diameter does not match the theoretical line diameter corresponding to the j-th laser line diameter. The preset similarity can be calibrated according to actual situations.

In another possible embodiment, the coincidence degree between the j-th laser line diameter and the theoretical line diameter corresponding to the j-th laser line diameter can be compared by graphic comparison. If the coincidence degree is greater than or equal to a preset coincidence degree, it is determined that the j-th laser line diameter matches the theoretical line diameter corresponding to the j-th laser line diameter. If the coincidence degree is less than the preset coincidence degree, it is determined that the j-th laser line diameter does not match the theoretical line diameter corresponding to the j-th laser line diameter. The preset coincidence degree can be calibrated according to actual situations.

In S404, if the j-th laser line diameter does not match the theoretical line diameter corresponding to the j-th laser line diameter, it is determined that the overhead line is abnormal.

Specifically, the first laser line diameter can be compared with the theoretical line diameter corresponding to the first laser line diameter. If the first laser line diameter does not match the theoretical line diameter corresponding to the first laser line diameter, it is determined that the overhead line is abnormal. For example, the overhead line is scattered or broken. If the first laser line diameter matches the theoretical line diameter corresponding to the first laser line diameter, the second laser line diameter is compared with the theoretical line diameter corresponding to the second laser line diameter. If the second laser line diameter does not match the theoretical line diameter corresponding to the second laser line diameter, it is determined that the overhead line is abnormal. For example, the overhead line is scattered or broken. If the second laser line diameter matches the theoretical line diameter corresponding to the second laser line diameter, a third laser line diameter is compared with the theoretical line diameter corresponding to the third laser line diameter, and so on, until the comparison between a N-th laser line diameter and the theoretical line diameter corresponding to the N-th laser line diameter is completed.

In summary, according to the overhead line detection method based on the cable inspection robot according to this embodiment of the present invention, first, the laser emission unit is controlled to emit N groups of parallel laser beams to the overhead line to form N parallel laser lines on the overhead line. The imaging unit is controlled to shoot the overhead line and the N parallel laser lines to acquire a target detection image. Then, image recognition is performed on the target detection image to acquire N laser line diameters corresponding to the N parallel laser lines on the overhead line. Finally, the N laser line diameters are compared with theoretical line diameters at corresponding positions to determine whether the overhead line is abnormal. Thus, laser lines are formed on an overhead line to determine whether the overhead line is abnormal. Manual inspection is not required. Therefore, the accuracy and efficiency of inspection can be greatly improved, and the inspection risk is reduced.

Corresponding to the overhead line detection method based on a cable inspection robot in the preceding embodiments, the present invention also provides an overhead line detection system based on a cable inspection robot.

Figure 5:
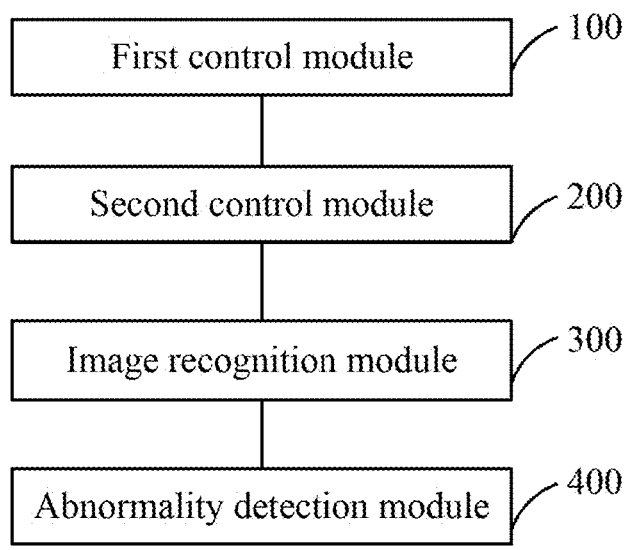
FIG. 5 is a block diagram of an overhead line detection system based on a cable inspection robot according to an embodiment of the present invention.

As shown in FIG. 5, according to this embodiment of the present invention, the overhead line detection system based on a cable inspection robot can include a first control module 100, a second control module 200, an image recognition module 300, and an abnormality detection module 400.

The first control module 100 is configured to control a laser emission unit to emit N groups of parallel laser beams to an overhead line to form N parallel laser lines on the overhead line, where N is a positive integer. The second control module 200 is configured to control an imaging unit to shoot the overhead line and the N parallel laser lines to acquire a target detection image. The image recognition module 300 is configured to perform image recognition on the target detection image to acquire N laser line diameters corresponding to the N parallel laser lines on the overhead line. The abnormality detection module 400 is configured to compare the N laser line diameters with theoretical line diameters at corresponding positions to determine whether the overhead line is abnormal.

It is to be noted that, as shown in FIG. 1, a cable inspection robot according to this embodiment of the present invention is suspended on an overhead line. An imaging unit and a laser emission unit are disposed at the front end of the cable inspection robot. The front end of the cable inspection robot is one end in the traveling direction of the cable inspection robot. The imaging unit may be a camera. The laser emission unit may be a laser. The optical axis of the imaging unit is at a first angle to the overhead line. The optical axis of the laser emission unit is at a second angle to the overhead line. The first angle is greater than 0 degrees and less than 90 degrees (for example, 30 degrees). The second angle is greater than 0 degrees and less than 90 degrees (for example, 60 degrees). The relationship between the first angle and the second angle can be calibrated according to actual situations to ensure that the imaging unit can shoot all parallel laser lines formed by the laser emission unit on the overhead line.

Specifically, based on the cable inspection robot shown in FIG. 1, first, according to the present invention, the first control module 100 can control the laser emission unit to emit N groups of parallel laser beams to the overhead line. For example, 9 groups of parallel laser beams are irradiated to the overhead line. The second angle between the laser emission unit and the overhead line can be set to ensure that the parallel laser beams are irradiated to a position of a preset distance in front of the cable inspection robot, for example, a position of 30 to 60 cm in front of the cable inspection robot. At this time, N parallel laser lines, for example, 9 parallel laser lines, can be formed on the overhead line. Since the laser emission unit emits laser lines (for example, red laser lines), the laser lines have a strong penetrating capability and can leave linear light strips on the cable in the case of strong outdoor light. Moreover, the second control module 200 controls the imaging unit to shoot the overhead line and the N parallel laser lines to acquire a target detection image. By setting the first angle between the imaging unit and the overhead line, the imaging unit can shoot the N parallel laser lines on the overhead line to acquire the target detection image. That is, as shown in FIG. 3, the target detection image can include the overhead line and the N parallel laser lines on the overhead line.

Next, the image recognition module 300 can perform image recognition on the target detection image to acquire N laser line diameters corresponding to the N parallel laser lines on the overhead line.

In an embodiment according to the present invention, the image recognition module 300 is specifically configured to extract a light strip with a width of a single pixel from a j-th parallel laser line by using a thinning algorithm to acquire a j-th light strip centerline. Then, a pixel set of the j-th light strip centerline in the target detection image is acquired. Finally, least-square circle fitting is performed on the pixel set to acquire a j-th laser line diameter corresponding to the j-th parallel laser line. $1 \leq j \leq N$, and j is a positive integer.

To accurately measure a laser line diameter, the light strip centerline of each parallel laser line needs to be identified first. According to the present invention, gaps between parallel laser lines do not need to be considered. Therefore, according to the present invention, a light strip with a width of a single pixel can be extracted from each parallel laser line by using a thinning algorithm to acquire a corresponding light strip centerline. Thus, the extraction speed is fast, and this process is not easily affected by noise.

Further, after a light strip centerline of each parallel laser line is extracted, that is, the light strip centerline of the j-th parallel laser line (the j-th light strip centerline) is extracted, the pixel set of the j-th light strip centerline in the target detection image can be acquired and denoted as a pixel set Pj (xk, yk) (k=1, 2, . . . , nj), where nj is the number of pixels of the j-th laser centerline. Then, least-square circle fitting is performed on the collected pixel set Pj (xk, yk) to obtain the j-th laser line diameter corresponding to the j-th parallel laser line.

Then, the abnormality detection module 400 is configured to compare the N laser line diameters with theoretical line diameters at corresponding positions to determine whether the overhead line is abnormal.

In an embodiment of the present invention, the abnormality detection module 400 can first calculate a distances between all pixels of the j-th light strip centerline and the imaging unit by using a laser triangulation method and select a first distance between the lowest pixel of the j-th light strip centerline and the imaging unit. As shown in FIG. 3, parallel laser lines irradiated by the laser emission unit on the overhead line may be arc-shaped. Therefore, extracted light strip centerlines are also arc-shaped. In the image, the light strip centerlines are in the shape of low in the middle and high on two sides. Correspondingly, the lowest pixel of the j-th light strip centerline can be Aj (only three light strip centerlines are shown in FIG. 3). The lowest pixel of a first light strip centerline may be $A_1$. The lowest pixel of a second light strip centerline may be $A_2$. The lowest pixel of a third light strip centerline may be $A_3$. After the distances between all pixels of each light strip centerline and the imaging unit are calculated by using the laser triangulation method, the distance between the lowest pixel of each light strip centerline and the imaging unit, that is, the first distance, can be selected. For example, as shown in FIG. 3, the distance between the lowest pixel $A_1$ of the first light strip centerline and the imaging unit is selected. The distance between the lowest pixel $A_2$ of the second light strip centerline and the imaging unit is selected. The distance between the lowest pixel $A_3$ of the third light strip centerline and the imaging unit is selected. That is, in the process of determining whether the overhead line is abnormal, the first distance can be a distance between the lowest point of each light strip centerline and the imaging unit selected after from the distances between all the pixels of each light strip centerline and the imaging unit are calculated by using the laser triangulation method.

Next, the abnormality detection module 400 can be configured to acquire a fitting model and a theoretical line diameter corresponding to the j-th laser line diameter according to the first distance by using the fitting model. After the first distance corresponding to the j-th parallel laser line is selected, the first distance can be input to the fitting model. At this time, the fitting model can output a corresponding theoretical line diameter, that is, a theoretical line diameter corresponding to the j-th laser line diameter.

It is to be noted that the fitting model can be obtained before the theoretical line diameter corresponding to the j-th laser line diameter is acquired according to the first distance by using the fitting model. The following describes in detail how to acquire a fitting model in connection with embodiments.

According to an embodiment of the present invention, the abnormality detection module 400 is also specifically configured to control the laser emission unit to emit K groups of parallel laser beams to an overhead line without abnormality to form K parallel laser lines on the overhead line, where K is a positive integer; control the imaging unit to shoot the overhead line and the K parallel laser lines to acquire a sample image; extract a light strip with a width of a single pixel from each of the K parallel laser lines by using the thinning algorithm to acquire K light strip centerlines corresponding to the K parallel laser lines; acquire a pixel set of each of the light strip centerlines in the sample image, and perform least-square circle fitting on the pixel set of the each of the light strip centerlines in the sample image to acquire K to-be-trained laser line diameters corresponding to the K parallel laser lines; calculate distances between all pixels of the each of the light strip centerlines and the imaging unit by using the laser triangulation method, and select a second distance between the lowest pixel of the each of the light strip centerlines and the imaging unit; and train a fitting algorithm according to a to-be-trained laser line diameter corresponding to the each parallel laser line and the second distance to acquire the fitting model.

Specifically, K groups of parallel laser beams can be first emitted to the overhead line without abnormality by the laser emission unit to form K parallel laser lines on the overhead line. The overhead line and the K parallel laser lines are shot by the imaging unit to acquire a sample image. The sample image may include the overhead line without abnormality and the K parallel laser lines on the overhead line without abnormality. Then, a light strip with a width of a single pixel is extracted from each of the K parallel laser lines by using the thinning algorithm to acquire K light strip centerlines corresponding to the K parallel laser lines. A pixel set of each of the light strip centerlines in the sample image is acquired. Least-square circle fitting is performed on the pixel set of the each of the light strip centerlines in the sample image to acquire K to-be-trained laser line diameters corresponding to the K parallel laser lines. Specific methods can refer to the preceding embodiments. To avoid redundancy, details are not described herein.

Further, distances between all pixels of each of the light strip centerlines and the imaging unit are calculated by using the laser triangulation method. A distance between the lowest pixel of the each of the light strip centerlines and the imaging unit, that is, the second distance, is selected. That is, in the process of acquiring the fitting model, the second distance can be a distance between the lowest pixel of each of the light strip centerlines and the imaging unit selected after the distances between all the pixels of each of the light strip centerlines and the imaging unit are calculated by using the laser triangulation method. Thus, the K to-be-trained laser line diameters corresponding to the K parallel laser lines and the second distance are used as inputs. The K to-be-trained laser line diameters are used as outputs to train the fitting algorithm to acquire the fitting model.

Then, the abnormality detection module 400 can be configured to compare the j-th laser line diameter with the theoretical line diameter corresponding to the j-th laser line diameter to determine whether the j-th laser line diameter matches the theoretical line diameter corresponding to the j-th laser line diameter.

In a possible embodiment, a similarity between the j-th laser line diameter and the theoretical line diameter corresponding to the j-th laser line diameter can be calculated to determine whether the j-th laser line diameter matches the theoretical line diameter corresponding to the j-th laser line diameter according to the similarity. Specifically, the similarity between the j-th laser line diameter and the theoretical line diameter corresponding to the j-th laser line diameter can be calculated by using the Frecher distance in MATLAB. If the similarity is greater than or equal to a preset similarity, it is determined that the j-th laser line diameter matches the theoretical line diameter corresponding to the j-th laser line diameter. If the similarity is less than the preset similarity, it is determined that the j-th laser line diameter does not match the theoretical line diameter corresponding to the j-th laser line diameter. The preset similarity can be calibrated according to actual situations.

In another possible embodiment, the coincidence degree between the j-th laser line diameter and the theoretical line diameter corresponding to the j-th laser line diameter can be compared by graphic comparison. If the coincidence degree is greater than or equal to a preset coincidence degree, it is determined that the j-th laser line diameter matches the theoretical line diameter corresponding to the j-th laser line diameter. If the coincidence degree is less than the preset coincidence degree, it is determined that the j-th laser line diameter does not match the theoretical line diameter corresponding to the j-th laser line diameter. The preset coincidence degree can be calibrated according to actual situations.

Finally, the abnormality detection module 400 is configured to determine that, in response to the j-th laser line diameter not matching the theoretical line diameter corresponding to the j-th laser line diameter, the overhead line is abnormal.

Specifically, the first laser line diameter can be compared with the theoretical line diameter corresponding to the first laser line diameter. If the first laser line diameter does not match the theoretical line diameter corresponding to the first laser line diameter, it is determined that the overhead line is abnormal. For example, the overhead line is scattered or broken. If the first laser line diameter matches the theoretical line diameter corresponding to the first laser line diameter, the second laser line diameter is compared with the theoretical line diameter corresponding to the second laser line diameter. If the second laser line diameter does not match the theoretical line diameter corresponding to the second laser line diameter, it is determined that the overhead line is abnormal. For example, the overhead line is scattered or broken. If the second laser line diameter matches the theoretical line diameter corresponding to the second laser line diameter, a third laser line diameter is compared with the theoretical line diameter corresponding to the third laser line diameter, and so on, until the comparison between a N-th laser line diameter and the theoretical line diameter corresponding to the N-th laser line diameter is completed.

Thus, according to the present invention, laser lines are formed on the overhead line to determine whether the overhead line is abnormal. Manual inspection is not required. Therefore, the accuracy and efficiency of inspection can be greatly improved, and the inspection risk is reduced.

According to the overhead line detection system based on the cable inspection robot according to this embodiment of the present invention, the first control module controls the laser emission unit to emit N groups of parallel laser beams to the overhead line to form N parallel laser lines on the overhead line. The second control module controls the imaging unit to shoot the overhead line and the N parallel laser lines to acquire a target detection image. The image recognition module performs image recognition on the target detection image to acquire N laser line diameters corresponding to the N parallel laser lines on the overhead line. The abnormality detection module compares the N laser line diameters with theoretical line diameters at corresponding positions to determine whether the overhead line is abnormal. Thus, laser lines are formed on the overhead line to determine whether the overhead line is abnormal. Manual inspection is not required. Therefore, the accuracy and efficiency of inspection can be greatly improved, and the inspection risk is reduced.

Corresponding to the preceding embodiments, the present invention also provides a computer device.

According to this embodiment of the present invention, a computer device includes a memory, a processor, and a computer program stored in the memory and executable by the processor. The processor, when executing the computer program, implements the preceding overhead line detection method based on a cable inspection robot.

In the computer device according to this embodiment of the present invention, when the processor executes the computer program stored in the memory, laser lines are formed on the overhead line to determine whether the overhead line is abnormal. Manual inspection is not required. Therefore, the accuracy and efficiency of inspection can be greatly improved, and the inspection risk is reduced.

Corresponding to the preceding embodiments, the present invention also provides a non-transitory computer-readable storage medium.

According to this embodiment of the present invention, the non-transitory computer-readable storage medium stores a computer program which, when executed by a processor, implements the preceding overhead line detection method based on a cable inspection robot.

In the non-transitory computer-readable storage medium according to this embodiment of the present invention, when the processor executes the computer program stored in the storage medium, laser lines are formed on the overhead line to determine whether the overhead line is abnormal. Manual inspection is not required. Therefore, the accuracy and efficiency of inspection can be greatly improved, and the inspection risk is reduced.

In the description of the present invention, terms such as "first" and "second" are merely for description and are not to be construed as indicating or implying relative importance or implicitly indicating the number of technical features as indicated. Thus, a feature defined as a "first" feature or a "second" feature may explicitly or implicitly include one or more of such features. The term "plurality" is defined as two or more, unless otherwise expressly specified and limited.

In the present invention, unless otherwise expressly specified and limited, the term "installed", "connected to each other", "connected", or "fixed" is to be construed in a broad sense, for example, as fixedly connected, detachably connected, or integrated; mechanically connected or electrically connected; directly connected to each other or indirectly connected to each other via an intermediary; or internally connected between two elements or interactional relations between two elements. For those of ordinary skilled in the art, the preceding terms can be construed according to specific circumstances in the present invention.

In the present invention, unless otherwise expressly specified and limited, when a first feature is described as "on" or "below" a second feature, the first feature and the second feature may be in direct contact, or be in indirect contact via an intermediary between the two features. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of the specification, the description of reference terms "an embodiment", "some embodiments", "example", "specific example", or "some examples" and the like means a specific characteristic, a structure, a material, or a feature described in connection with the embodiment or the example are included in at least one embodiment or example of the present invention. In the specification, the illustrative description of the preceding terms does not necessarily refer to the same embodiment or example. Moreover, the described specific features, structures, materials, or characteristics may be combined in an appropriate manner in any one or more embodiments or examples. In addition, the different embodiments or examples described in this specification and the features of the different embodiments or examples may be combined and combined by those skilled in the art without contradicting each other.

It is to be understood that each part of the present invention may be implemented by hardware, software, firmware, or a combination thereof. In the preceding embodiments, multiple steps or methods may be implemented by software or firmware stored in a memory and executed by a suitable instruction execution system. For example, if hardware is used for implementation, as in another embodiment, any one or a combination of the following technologies well known in the art can be used for implementation: discrete logic circuits having logic gate circuits used for implementing logic functions on data signals, application-specific integrated circuits having suitable combinational logic gates, programmable gate arrays (PGAs), field programmable gate arrays (FPGAs), and the like.

It is to be understood by those of ordinary skill in the art that all or part of the steps in the methods of the preceding embodiments may be implemented by related hardware instructed by a program. The program may be stored in a computer-readable storage medium. When the program is executed, one of or a combination of the steps in the method embodiments is implemented.

Additionally, various functional units in each embodiment of the present invention may be integrated into one processing unit, or each unit may be physically presented separately, or two or more units may be integrated into one module. The preceding integrated unit may be implemented by hardware or a software functional module. The integrated module may also be stored in a computer-readable storage medium if implemented in the form of software function modules and sold or used as an independent product.

The above-mentioned storage medium may be a read-only memory, a magnetic disk, an optical disk, or the like. Although the embodiments of the present invention have been shown and described above, it is to be understood that the preceding embodiments are exemplary and are not to be construed as limiting the invention. Changes, modifications, substitutions, and variations of the preceding embodiments may be made by those skilled in the art within the scope of the present invention.

What is claimed is:

1. An overhead line detection method based on a cable inspection robot, wherein the cable inspection robot is suspended on an overhead line, an imaging unit and a laser emission unit are disposed at a front end of the cable inspection robot, an optical axis of the imaging unit is at a first angle to the overhead line, an optical axis of the laser emission unit is at a second angle to the overhead line, and the overhead line detection method comprises following steps:

controlling the laser emission unit to emit N groups of parallel laser beams to the overhead line to form N parallel laser lines on the overhead line, wherein N is a positive integer;

controlling the imaging unit to shoot the overhead line and the N parallel laser lines to acquire a target detection image;

performing image recognition on the target detection image to acquire N laser line diameters corresponding to the N parallel laser lines on the overhead line, wherein performing image recognition on the target detection image to acquire the N laser line diameters corresponding to the N parallel laser lines on the overhead line specifically comprises:

extracting a light strip with a width of a single pixel from a j-th parallel laser line of the N parallel laser lines by using a thinning algorithm to acquire a j-th light strip centerline, wherein $1 \leq j \leq N$, and j is a positive integer;

acquiring a pixel set of the j-th light strip centerline in the target detection image; and performing least-square circle fitting on the pixel set to acquire a j-th laser line diameter corresponding to the j-th parallel laser line; and comparing the N laser line diameters with theoretical line diameters at corresponding positions to determine whether the overhead line is abnormal, wherein comparing the N laser line diameters with the theoretical line diameters at corresponding positions to determine whether the overhead line is abnormal specifically comprises:

calculating a distances between all pixels of the j-th light strip centerline and the imaging unit by using a laser triangulation method, and selecting a first distance between a lowest pixel of the j-th light strip centerline and the imaging unit;

acquiring a fitting model, and acquiring a theoretical line diameter corresponding to the j-th laser line diameter according to the first distance by using the fitting model;

comparing the j-th laser line diameter with the theoretical line diameter corresponding to the j-th laser line diameter to determine whether the j-th laser line diameter matches the theoretical line diameter corresponding to the j-th laser line diameter; and in response to the j-th laser line diameter not matching the theoretical line diameter corresponding to the j-th laser line diameter, determining that the overhead line is abnormal.

2. The overhead line detection method based on a cable inspection robot according to claim 1, wherein comparing the j-th laser line diameter with the theoretical line diameter corresponding to the j-th laser line diameter to determine whether the j-th laser line diameter matches the theoretical line diameter corresponding to the j-th laser line diameter specifically comprises:

calculating a similarity between the j-th laser line diameter and the theoretical line diameter corresponding to the j-th laser line diameter;

in response to the similarity being greater than or equal to a preset similarity, determining that the j-th laser line diameter matches the theoretical line diameter corresponding to the j-th laser line diameter; and in response to the similarity being less than the preset similarity, determining that the j-th laser line diameter does not match the theoretical line diameter corresponding to the j-th laser line diameter.

3. The overhead line detection method based on a cable inspection robot according to claim 2, wherein acquiring the fitting model comprises:

controlling the laser emission unit to emit K groups of parallel laser beams to an overhead line without abnormality to form K parallel laser lines on the overhead line, wherein K is a positive integer;

controlling the imaging unit to shoot the overhead line and the K parallel laser lines to acquire a sample image;

extracting a light strip with a width of a single pixel from each of the K parallel laser lines by using the thinning algorithm to acquire light strip centerlines corresponding to the K parallel laser lines;

acquiring a pixel set of each of the light strip centerlines in the sample image, and performing least-square circle fitting on the pixel set of the each of the light strip centerlines in the sample image to acquire K to-be-trained laser line diameters corresponding to the K parallel laser lines;

calculating distances between all pixels of the each of the light strip centerlines and the imaging unit by using the laser triangulation method, and selecting a second distance between a lowest pixel of the each of the light strip centerlines and the imaging unit; and obtaining the fitting model by training a fitting algorithm according to a to-be-trained laser line diameter of the K to-be-trained laser line diameters corresponding to the each of the K parallel laser lines and the second distance.

4. A computer device, comprising a memory, a processor, and a computer program stored in the memory and executable by the processor, wherein the processor, when executing the computer program, implements an overhead line detection method based on a cable inspection robot; wherein the cable inspection robot is suspended on an overhead line, an imaging unit and a laser emission unit are disposed at a front end of the cable inspection robot, an optical axis of the imaging unit is at a first angle to the overhead line, an optical axis of the laser emission unit is at a second angle to the overhead line, and the overhead line detection method comprises following steps:

controlling the laser emission unit to emit N groups of parallel laser beams to the overhead line to form N parallel laser lines on the overhead line, wherein N is a positive integer;

controlling the imaging unit to shoot the overhead line and the N parallel laser lines to acquire a target detection image;

performing image recognition on the target detection image to acquire N laser line diameters corresponding to the N parallel laser lines on the overhead line, wherein performing image recognition on the target detection image to acquire the N laser line diameters corresponding to the N parallel laser lines on the overhead line specifically comprises:

extracting a light strip with a width of a single pixel from a j-th parallel laser line of the N parallel laser lines by using a thinning algorithm to acquire a j-th light strip centerline, wherein $1 \leq j \leq N$, and j is a positive integer;

acquiring a pixel set of the j-th light strip centerline in the target detection image; and performing least-square circle fitting on the pixel set to acquire a j-th laser line diameter corresponding to the j-th parallel laser line; and comparing the N laser line diameters with theoretical line diameters at corresponding positions to determine whether the overhead line is abnormal, wherein comparing the N laser line diameters with the theoretical line diameters at corresponding positions to determine whether the overhead line is abnormal specifically comprises:

calculating a distances between all pixels of the j-th light strip centerline and the imaging unit by using a laser triangulation method, and selecting a first distance between a lowest pixel of the j-th light strip centerline and the imaging unit;

acquiring a fitting model, and acquiring a theoretical line diameter corresponding to the j-th laser line diameter according to the first distance by using the fitting model;

comparing the j-th laser line diameter with the theoretical line diameter corresponding to the j-th laser line diameter to determine whether the j-th laser line diameter matches the theoretical line diameter corresponding to the j-th laser line diameter; and in response to the j-th laser line diameter not matching the theoretical line diameter corresponding to the j-th laser line diameter, determining that the overhead line is abnormal.

5. A non-transitory computer-readable storage medium storing a computer program which, when executed by a processor, implements the overhead line detection method based on a cable inspection robot;

wherein the cable inspection robot is suspended on an overhead line, an imaging unit and a laser emission unit are disposed at a front end of the cable inspection robot, an optical axis of the imaging unit is at a first angle to the overhead line, an optical axis of the laser emission unit is at a second angle to the overhead line, and the overhead line detection method comprises following steps:

controlling the laser emission unit to emit N groups of parallel laser beams to the overhead line to form N parallel laser lines on the overhead line, wherein N is a positive integer;

controlling the imaging unit to shoot the overhead line and the N parallel laser lines to acquire a target detection image;

performing image recognition on the target detection image to acquire N laser line diameters corresponding to the N parallel laser lines on the overhead line, wherein performing image recognition on the target detection image to acquire the N laser line diameters corresponding to the N parallel laser lines on the overhead line specifically comprises:

extracting a light strip with a width of a single pixel from a j-th parallel laser line of the N parallel laser lines by using a thinning algorithm to acquire a j-th light strip centerline, wherein $1 \leq j \leq N$, and j is a positive integer;

acquiring a pixel set of the j-th light strip centerline in the target detection image; and performing least-square circle fitting on the pixel set to acquire a j-th laser line diameter corresponding to the j-th parallel laser line; and comparing the N laser line diameters with theoretical line diameters at corresponding positions to determine whether the overhead line is abnormal, wherein comparing the N laser line diameters with the theoretical line diameters at corresponding positions to determine whether the overhead line is abnormal specifically comprises:

calculating a distances between all pixels of the j-th light strip centerline and the imaging unit by using a laser triangulation method, and selecting a first distance between a lowest pixel of the j-th light strip centerline and the imaging unit;

acquiring a fitting model, and acquiring a theoretical line diameter corresponding to the j-th laser line diameter according to the first distance by using the fitting model;

comparing the j-th laser line diameter with the theoretical line diameter corresponding to the j-th laser line diameter to determine whether the j-th laser line diameter matches the theoretical line diameter corresponding to the j-th laser line diameter; and in response to the j-th laser line diameter not matching the theoretical line diameter corresponding to the j-th laser line diameter, determining that the overhead line is abnormal.

6. The computer device according to claim 4, wherein the comparing the j-th laser line diameter with the theoretical line diameter corresponding to the j-th laser line diameter to determine whether the j-th laser line diameter matches the theoretical line diameter corresponding to the j-th laser line diameter specifically comprises:
- calculating a similarity between the j-th laser line diameter and the theoretical line diameter corresponding to the j-th laser line diameter;
- in response to the similarity being greater than or equal to a preset similarity, determining that the j-th laser line diameter matches the theoretical line diameter corresponding to the j-th laser line diameter; and
- in response to the similarity being less than the preset similarity, determining that the j-th laser line diameter does not match the theoretical line diameter corresponding to the j-th laser line diameter.

7. The computer device according to claim 6, wherein the acquiring the fitting model comprises:
- controlling the laser emission unit to emit K groups of parallel laser beams to an overhead line without abnormality to form K parallel laser lines on the overhead line, wherein K is a positive integer;
- controlling the imaging unit to shoot the overhead line and the K parallel laser lines to acquire a sample image;
- extracting a light strip with a width of a single pixel from each of the K parallel laser lines by using the thinning algorithm to acquire light strip centerlines corresponding to the K parallel laser lines;
- acquiring a pixel set of each of the light strip centerlines in the sample image, and performing least-square circle fitting on the pixel set of the each of the light strip centerlines in the sample image to acquire K to-be-trained laser line diameters corresponding to the K parallel laser lines;
- calculating distances between all pixels of the each of the light strip centerlines and the imaging unit by using the laser triangulation method, and selecting a second distance between a lowest pixel of the each of the light strip centerlines and the imaging unit; and
- obtaining the fitting model by training a fitting algorithm according to a to-be-trained laser line diameter of the K to-be-trained laser line diameters corresponding to the each of the K parallel laser lines and the second distance.

8. The non-transitory computer-readable storage medium according to claim 5, wherein the comparing the j-th laser line diameter with the theoretical line diameter corresponding to the j-th laser line diameter to determine whether the j-th laser line diameter matches the theoretical line diameter corresponding to the j-th laser line diameter specifically comprises:
- calculating a similarity between the j-th laser line diameter and the theoretical line diameter corresponding to the j-th laser line diameter;
- in response to the similarity being greater than or equal to a preset similarity, determining that the j-th laser line diameter matches the theoretical line diameter corresponding to the j-th laser line diameter; and
- in response to the similarity being less than the preset similarity, determining that the j-th laser line diameter does not match the theoretical line diameter corresponding to the j-th laser line diameter.

9. The non-transitory computer-readable storage medium according to claim 8, wherein the acquiring the fitting model comprises:
- controlling the laser emission unit to emit K groups of parallel laser beams to an overhead line without abnormality to form K parallel laser lines on the overhead line, wherein K is a positive integer;
- controlling the imaging unit to shoot the overhead line and the K parallel laser lines to acquire a sample image;
- extracting a light strip with a width of a single pixel from each of the K parallel laser lines by using the thinning algorithm to acquire light strip centerlines corresponding to the K parallel laser lines;
- acquiring a pixel set of each of the light strip centerlines in the sample image, and performing least-square circle fitting on the pixel set of the each of the light strip centerlines in the sample image to acquire K to-be-trained laser line diameters corresponding to the K parallel laser lines;
- calculating distances between all pixels of the each of the light strip centerlines and the imaging unit by using the laser triangulation method, and selecting a second distance between a lowest pixel of the each of the light strip centerlines and the imaging unit; and
- obtaining the fitting model by training a fitting algorithm according to a to-be-trained laser line diameter of the K to-be-trained laser line diameters corresponding to the each of the K parallel laser lines and the second distance.

\* \* \* \* \*